(12) United States Patent
Carnahan (10) Patent No.: US 6,273,505 B1
(45) Date of Patent: Aug. 14, 2001

(54) WEB ADJUSTER FOR INFANT PRODUCTS (75) Inventor: Michael Carnahan, Bedford, OH (US)

(73) Assignee: Graco Children's Products Inc., Riverson, PA (US)

( * ) Notice: Subject to any disclaimer, the term of this patent is extended or adjusted under 35 U.S.C. 154(b) by 0 days.

(21) Appl. No.: 09/422,935

(22) Filed: Oct. 22, 1999

(51) Int. Cl.$^7$ ................................. B60N 2/28; A47D 1/10
(52) U.S. Cl. ................. 297/250.1; 297/467; 297/468; 297/48; 24/631; 24/642; 24/656
(58) Field of Search ................. 297/250.1, 467, 297/468, 473, 474, 483; 24/631, 641, 642, 656, 637, 230 AL, 230 A (56) References Cited

U.S. PATENT DOCUMENTS

| D. 285,383 | 9/1986 | Anthony | D2/405 |
|---|---|---|---|
| D. 342,465 | 12/1993 | Anthony et al. | D11/218 |
| 3,434,186 | * 3/1969 | Rennert . | |
| 3,872,550 | * 3/1975 | Yang | 24/191 X |
| 3,928,895 | 12/1975 | Klink . | |
| 4,128,924 | 12/1978 | Happel et al. | 24/230 AL |
| 4,184,234 | 1/1980 | Anthony et al. | 24/196 |
| 4,196,500 | 4/1980 | Happel et al. | 24/230 AL |
| 4,366,604 | 1/1983 | Anthony et al. | 24/230 A |
| 4,425,688 | 1/1984 | Anthony et al. | 24/656 |
| 4,617,705 | 10/1986 | Anthony et al. | 24/642 |
| 4,651,946 | 3/1987 | Anthony et al. | 242/107.2 |
| 4,660,889 | 4/1987 | Anthony et al. | 297/467 |
| 4,679,852 | 7/1987 | Anthony et al. | 297/464 |
| 4,720,148 | 1/1988 | Anthony et al. | 297/474 |
| 4,726,625 | 2/1988 | Bougher | 297/483 |
| 4,832,410 | 5/1989 | Bougher | 297/474 |
| 4,876,770 | 10/1989 | Bougher | 24/170 |
| 4,876,772 | 10/1989 | Anthony et al. | 24/637 |
| 4,878,271 | 11/1989 | Kitokovsky . | |
| 4,911,377 | 3/1990 | Lortz et al. | 242/107.4 D |
| 4,919,484 | 4/1990 | Bougher et al. | 297/474 |
| 4,942,649 | 7/1990 | Anthony et al. | 24/637 |
| 4,945,615 | 8/1990 | Anthony et al. | 24/573.5 |
| 5,015,010 | 5/1991 | Homeier et al. | 280/808 |
| 5,023,981 | 6/1991 | Anthony et al. | 24/573 |
| 5,031,962 | 7/1991 | Lee | 297/479 |

(List continued on next page.)

FOREIGN PATENT DOCUMENTS 0 532 032 A1    3/1993  (EP) .
0 582 559 A2    2/1994  (EP) .

* cited by examiner

Primary Examiner—Peter M. Cuomo
Assistant Examiner—Rodney B. White
(74) Attorney, Agent, or Firm—Foley & Lardner (57) ABSTRACT

A web adjuster for securing a web and a seat including the web adjuster. The web extends through the web adjuster including a mounting plate that is mounted to the seat. A sliding plate moves relative to the mounting plate for lockingly engaging the web. Resilient biasing elements bias the sliding plate into locking engagement, and a release handle displaces the sliding plate against the resilient biasing elements.

12 Claims, 11 Drawing Sheets

U.S. PATENT DOCUMENTS

| | | | |
|---|---|---|---|
| 5,038,446 | 8/1991 | Anthony et al. | 24/573.5 |
| 5,039,169 | 8/1991 | Bougher et al. | 297/484 |
| 5,084,946 | 2/1992 | Lee | 24/625 |
| 5,142,748 | 9/1992 | Anthony et al. | 24/573.5 |
| 5,160,186 | 11/1992 | Lee | 297/479 |
| 5,176,402 | 1/1993 | Coulon | 280/807 |
| 5,182,837 | 2/1993 | Anthony et al. | 24/642 |
| 5,219,206 | 6/1993 | Anthony et al. | 297/473 |
| 5,219,207 | 6/1993 | Anthony et al. | 297/473 |
| 5,282,706 | 2/1994 | Anthony et al. | 410/100 |
| 5,286,090 | 2/1994 | Templin et al. | 297/473 |
| 5,292,181 | 3/1994 | Dybro | 297/468 |
| 5,308,148 | 5/1994 | Peterson et al. | 297/468 |
| 5,311,653 | 5/1994 | Merrick | 24/196 |
| 5,370,333 | 12/1994 | Lortz et al. | 242/384.1 |
| 5,375,879 | 12/1994 | Williams et al. | 280/749 |
| 5,380,066 | 1/1995 | Wiseman et al. | 297/476 |
| 5,443,302 | 8/1995 | Dybro | 297/471 |
| 5,497,956 | 3/1996 | Crook | 242/382.1 |
| 5,511,856 | 4/1996 | Merrick et al. | 297/476 |
| 5,516,199 | 5/1996 | Crook et al. | 297/468 |
| 5,536,042 | 7/1996 | Williams et al. | 280/749 |
| 5,560,565 | 10/1996 | Merrick et al. | 297/476 |
| 5,568,676 | 10/1996 | Freeman | 24/641 |
| 5,622,327 | 4/1997 | Heath et al. | 242/383.4 |
| 5,669,572 | 9/1997 | Crook | 242/382.1 |
| 5,695,243 | 12/1997 | Anthony et al. | 297/250 |
| 5,779,319 | 7/1998 | Merrick | 297/484 |
| 5,813,097 | 9/1998 | Woellert et al. | 24/631 |
| 5,839,793 | 11/1998 | Merrick et al. | 297/484 |
| 5,873,635 | 2/1999 | Merrick | 297/484 |

WEB ADJUSTER FOR INFANT PRODUCTS

BACKGROUND

A conventional child seat includes a harness which is releasably securable around the child with the harness passing over the child's shoulders and having a front end releasably locked with a buckle or similar fastening device. The harness passes over the child's shoulders and through the seat and has an opposite end frictionally engaged by a web adjuster mounted to the seat. Conventional web adjusters have a pivotally mounted cam member which may be released to facilitate sizing of the harness relative to the child. Examples of conventional web adjusters incorporating pivotally mounted cams with gripping surfaces for holding webs are shown in U.S. Pat. Nos. 3,434,186 (Rennert) and 3,872,550 (Yang).

SUMMARY OF THE INVENTION

The present invention is drawn to a web adjuster for securing straps, webs, or belts. The web adjuster can lock a web used for adjusting a harness for a child seat. The adjuster can limit longitudinal movement of an elongated web with respect to a base. The web adjuster includes a mounting plate, a sliding plate, and at least one resilient element biasing the sliding plate with respect to the mounting plate. The mounting plate, which is fixed to the base, includes first and second major faces generally lying in parallel spaced planes and a bridge rising above the second major face. The mounting plate is penetrated by a first aperture. The sliding plate, which is displaceable in shear with respect to the mounting plate, includes first and second major surfaces generally lying in a parallel spaced planes that are also parallel to the first and second major faces of the mounting plate. The sliding plate also includes at least one finger retaining the sliding plate with respect to the mounting plate, a plateau rising above the first major surface, and a neck extending transversely under the bridge. Each finger confronts and slidingly engages the first major face of the mounting plate. The sliding plate is penetrated by a second aperture.

The present invention is also drawn to a child seat having a harness and including the web adjuster.

BRIEF DESCRIPTION OF THE DRAWINGS

The accompanying drawings show illustrative embodiments of the invention wherein identical numerals indicate like features. However, not all features are indicated or shown in each figure.

DETAILED DESCRIPTION OF THE PREFERRED EMBODIMENT

Figure 30:
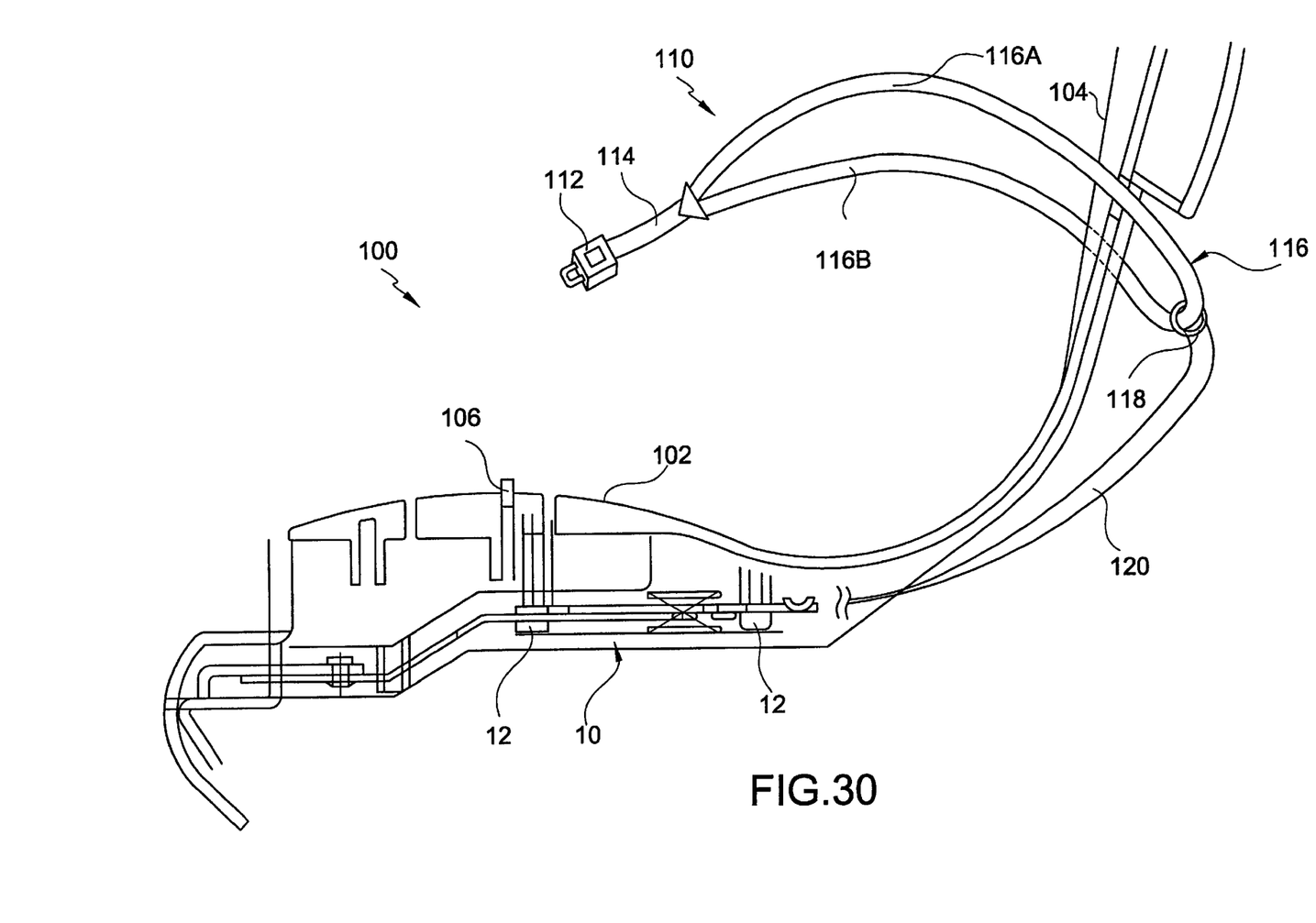
FIG. 30 is a schematic view illustrating the relationship between a web adjuster according to the present invention and a child's seat.

Referring initially to FIG. 30, a child seat 100 includes a seat portion 102 and a back portion 104. A harness 110 secures a child with respect to the seat 100. The harness 110 comprises a releasable latch 112 connected to a crotch strap 114. In operation, the crotch strap 114 is received between the legs of the child and the latch 112 is received in a mating buckle 106 on the seat portion 102. The crotch strap 114 is connected to the ends of a bight 116 that forms two shoulder straps 116A and 116B. The bight 116 is looped through a ring 118 on the rear side of the back portion 104.

The ring 118 is connected to an adjustment web 120 that is threaded through a web adjuster 10. The web adjuster 10, which will be described in greater detail below, is used to set the length of the adjustment web 120 between the web adjuster 10 and the ring 118. Reducing this length of the adjustment web 120 tightens the harness 110 by displacing a portion of the shoulder straps 116A, 116B from the front side of the back portion 104 to the rear side of the back portion 104.

Figure 1:
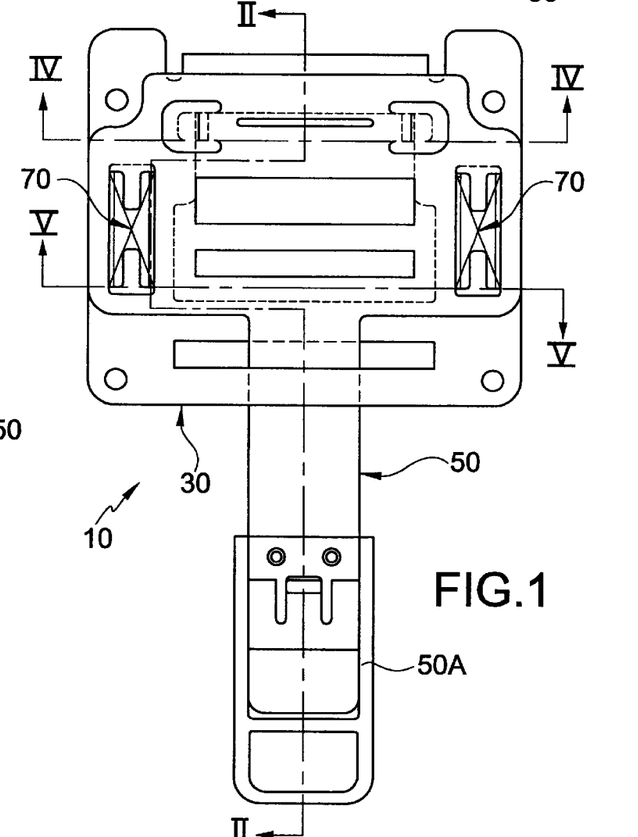
FIG. 1 is a plan view of a web adjuster in accordance with a first embodiment of the present invention.
Figure 2:
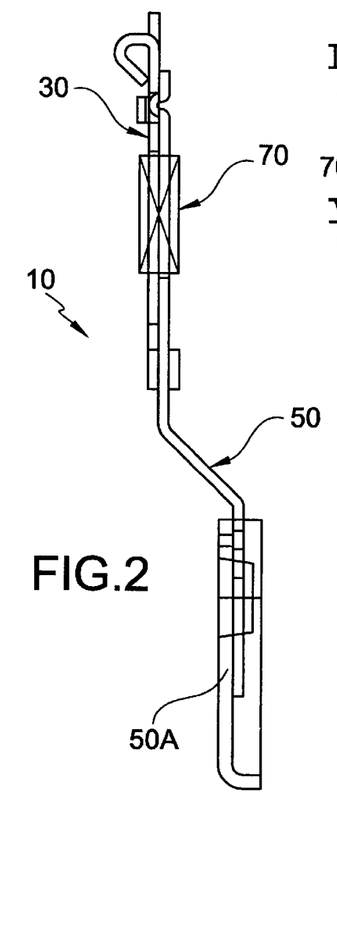
FIG. 2 is a cross-section view taken along line II—II in FIG. 1.
Figure 3:
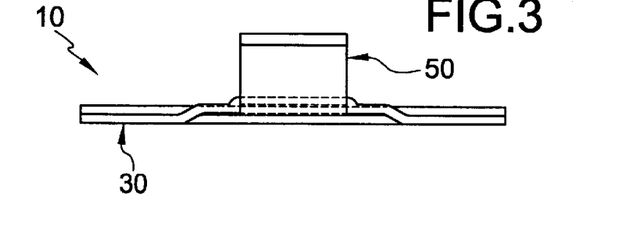
FIG. 3 is a front elevation view of the web adjuster shown in FIG. 1.
Figure 4:
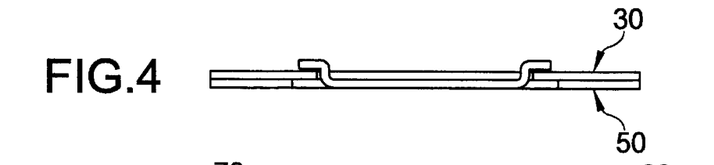
FIG. 4 is a cross-section view taken along line IV—IV in FIG. 1.
Figure 5:
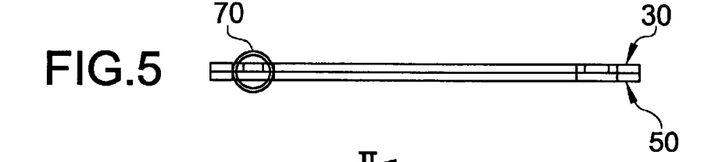
FIG. 5 is a cross-section view taken along line V—V in FIG. 1.

Referring additionally to FIGS. 1–17, a first embodiment of the web adjuster 10 to the present invention will now be described. The web adjuster 10 comprises a mounting plate 30, a sliding plate 50, and at least one resilient biasing element 70. Two biasing elements 70 are indicated schematically in FIG. 1.

The mounting plate 30, which is best seen in FIGS. 6–9, includes a plurality of holes 32 (four are shown in the figures) for securing the mounting plate to the bottom of the seat portion 102. Fasteners 12, e.g., screws, extend through the holes 32 and are fixedly received in corresponding holes on the seat portion 102. The mounting plate 30 can be secured to the seat portion 102 by more or less fasteners, can be secured with different types of fasteners, or can be secured with a combination of fastener types.

The mounting plate 30 comprises a first major face 34 and an opposite second major face 36. The first and second major faces 34,36 generally lie in respective first and second parallel planes and are spaced by a distance equal to the thickness of the mounting plate 30.

A first bridge 38 rises a second distance above the second major face 36, i.e., away from the first major face 34, so as to define a sliding channel 39 (FIG. 8) between the second major face 36 and the underside of the first bridge 38. The first bridge 38 can include shoulder portions 38A and 38B supporting a central portion 38C. The shoulder portions 38A,38B define sides of the sliding channel 39 for guiding movement of the sliding plate 50 as will be further described below.

The mounting plate 30 is also penetrated by a first aperture 40, which is defined in part by an edge 42. The web 120 extends through the first aperture 40. When the web adjuster 10 is in a locking configuration, which will be further described with respect to FIG. 17, the web 120 is pressed against the edge 42.

Figure 6:
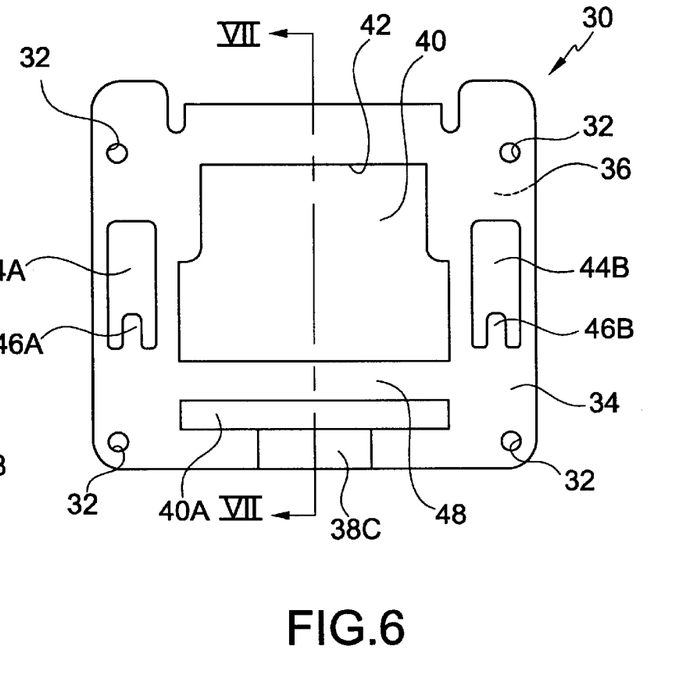
FIG. 6 is a plan view of the mounting plate for the web adjuster shown in FIG. 1.

The mounting plate 30 also includes holes 44A and 44B receiving the resilient biasing elements 70. The holes 44A, 44B are defined in part by respective tongues 46A and 46B that support the biasing elements 70 with respect to the mounting plate 30. The number, size, and shape of the holes 44A,44B and tongues 46A,46B can vary in accordance with the number, size, and type of corresponding biasing elements 70.

The mounting plate 30 further includes a second bridge 48 that divides the aperture 40, thereby defining a sub-aperture 40A. The sub-aperture 40A separates the first and second bridges 38,48.

Figure 7:
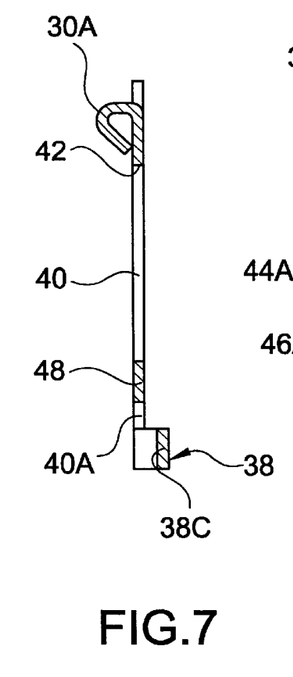
FIG. 7 is a cross-section view taken along line VII—VII in FIG. 6.
Figure 8:
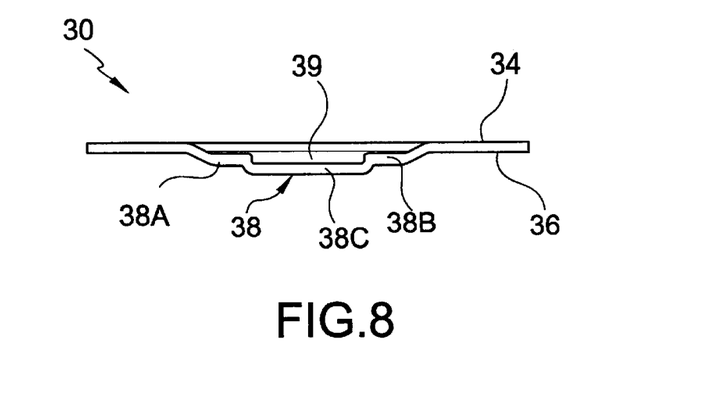
FIG. 8 is a front elevation view of the mounting plate shown in FIG. 6.
Figure 9:
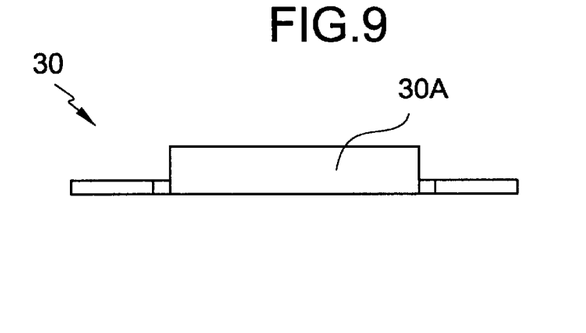
FIG. 9 is a back elevation view of the mounting plate shown in FIG. 6.

The mounting plate 30 additionally includes a ridge 30A rising above the first major face 34, i.e., away from the second major face 36. The ridge 30A provides a guide for the adjustment web 120, as will be further described with respect to FIG. 17. As shown in FIG. 7, the ridge 30A can be formed as a rolled-over portion of the mounting plate 30. The ridge 30A can alternatively be formed by stamping an upset in the mounting plate 30, or by fixing a separate body to the first major face 34.

The sliding plate 50, which is best seen in FIGS. 10–16, comprises an elongated neck 52 to which a handle 50A (FIGS. 1 and 2) is secured. The handle 50A is grasped by a caregiver for displacing the sliding plate 50, via the neck 52, with respect to the mounting plate 30. The neck 52 is longitudinally displaceable in the sliding channel 39 of the mounting plate. The operation of the sliding plate 50 relative to the mounting plate 30 is described below in greater detail.

Figures 10, 11, 12:
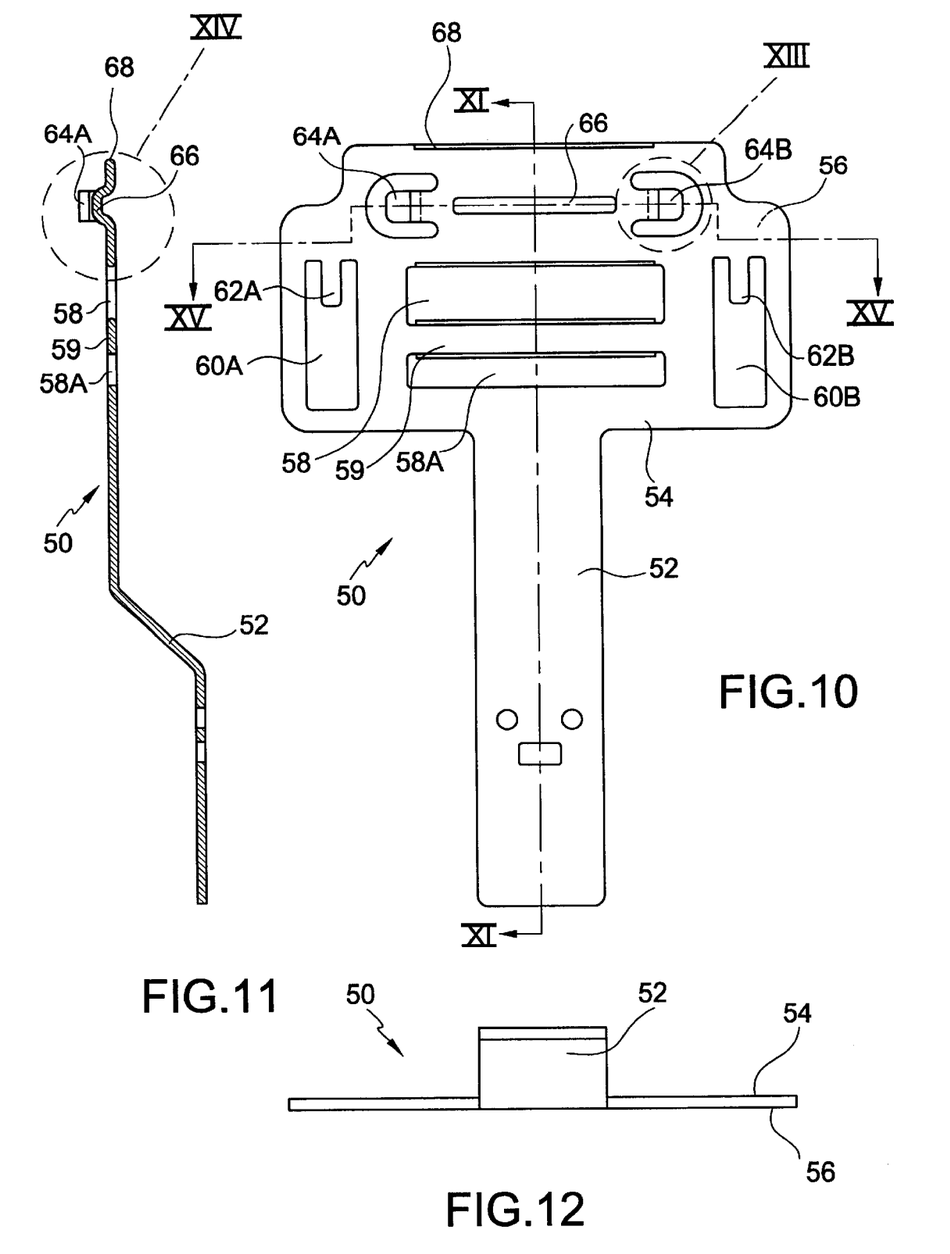
FIG. 10 is a plan view of the sliding plate for the web adjuster shown in FIG. 1.
FIG. 11 is a cross-section view taken along line XI—XI in FIG. 10.
FIG. 12 is a front elevation view of the sliding plate shown in FIG. 10.
Figure 13:
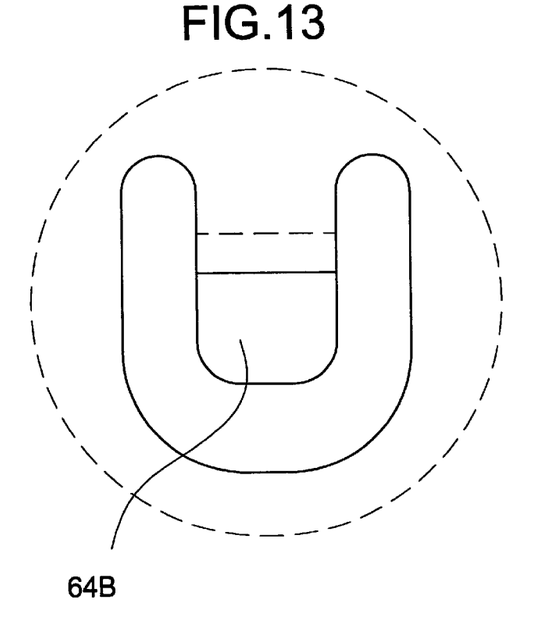
FIG. 13 is a detail view of the portion indicated XIII in FIG. 10.
Figure 14:
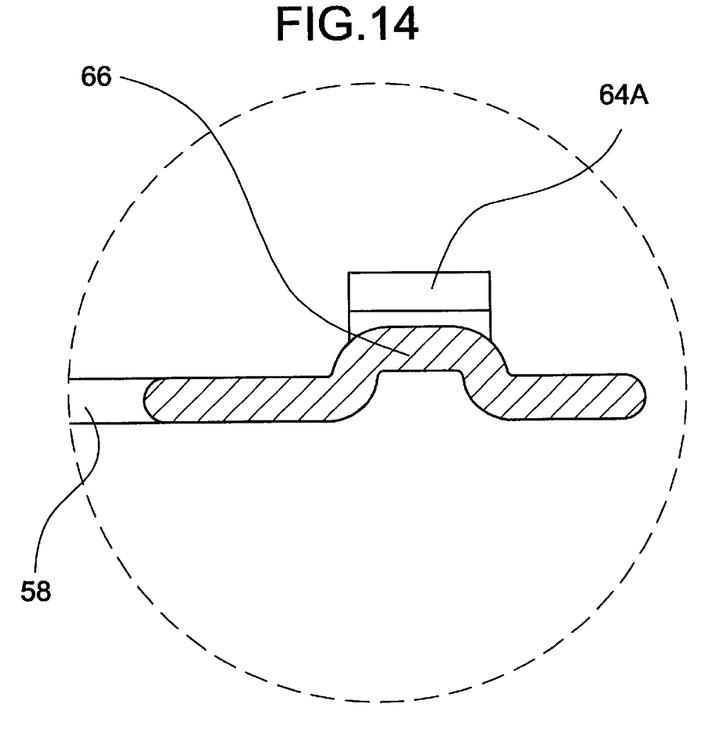
FIG. 14 is a detail view of the portion indicated XIV in FIG. 11.
Figure 15:
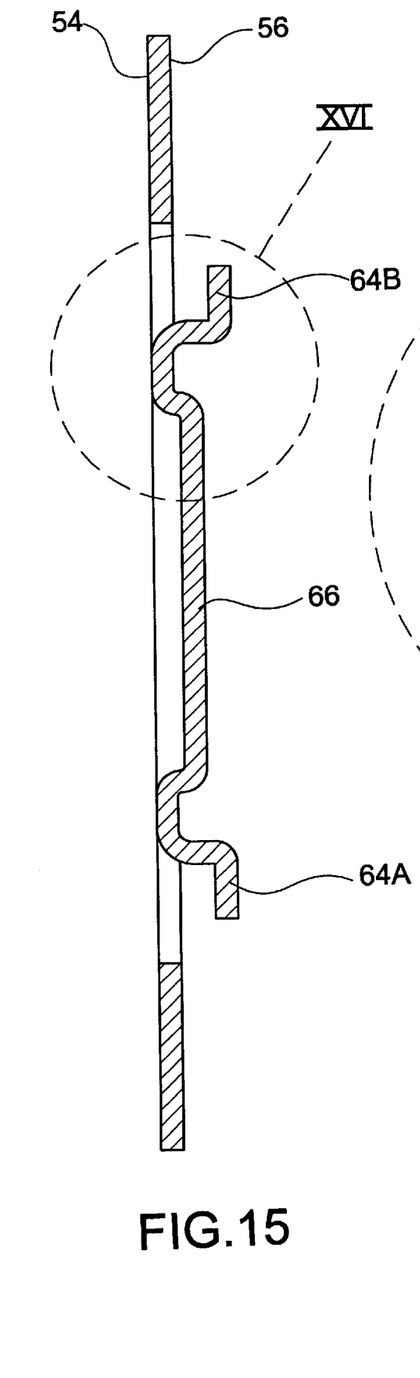
FIG. 15 is a cross-section view taken along line XV—XV in FIG. 10.

The sliding plate 50 also comprises a first major surface 54 and an opposite second major surface 56. The first and second major surfaces 54,56 generally lie in respective third and fourth planes, which are mutually parallel to the first plane, and are spaced by a distance equal to the thickness of the sliding plate 50.

The sliding plate 50 is penetrated by an aperture 58. A bridge 59 divides the aperture 58, thereby defining a sub-aperture 58A. The web 120 extends through the aperture 58 and the sub-aperture 58A, as will be further described with respect to FIG. 17.

The sliding plate 50 also includes holes 60A and 60B receiving the resilient biasing elements 70. The holes 60A, 60B are defined in part by respective tongues 62A and 62B that support the biasing elements 70 with respect to the sliding plate 50. The number, size, and shape of the holes 60A,60B and tongues 62A,62B can vary in accordance with the number, size, and type of biasing elements 70, and generally will correspond to the holes 44A,44B and tongues 46A,46B.

Figure 16:
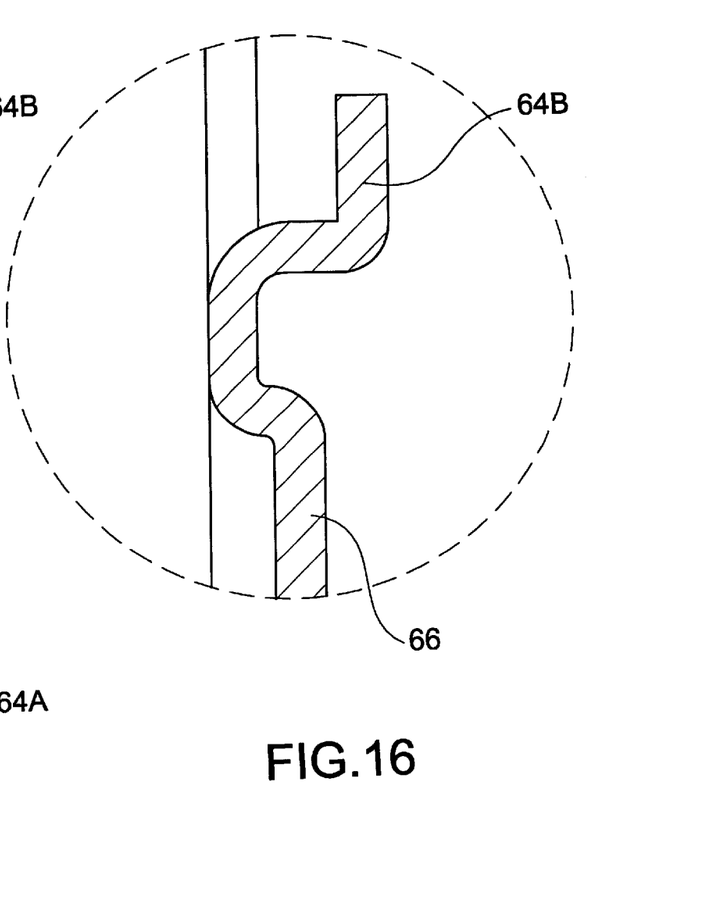
FIG. 16 is a detail view of the portion indicated XVI in FIG. 15.

The sliding plate 50 further includes a pair of fingers 64A and 64B that are stamped out and pressed in a hook shaped arrangement as best shown in FIG. 16. The portions of the first major surface 54 defined by the fingers 64A,64B, i.e., the inside of the hook shape, confront and slidingly engage the first major face 34 on opposite lateral sides of the first aperture 40. The sliding plate 50 can include more or less than two fingers. Having at least one finger engaging the first major face 34 on both lateral sides of the aperture 40 better defines the reciprocal movement of the sliding plate 50 with respect to the mounting plate 30. This is especially the case in combination with shoulders 38A,38B of the bridge 38 flanking the opposite lateral sides of the neck 52.

The sliding plate also comprises a plateau 66 that extends in the area of the sliding plate 50 that generally lies between the fingers 64A,64B. The plateau 66 rises above the second major surface 56 of the sliding plate 50, i.e., away from the first major surface 54. In operation, when the web adjuster 10 is in a locking configuration, which will be further described with respect to FIG. 17, the plateau 66 presses the web 120 against the edge 42 of the aperture 40. The plateau 66 can be formed, for example, by stamping an upset in the sliding plate 50 or by fixing a separate body to the second major surface 56.

Figure 17:
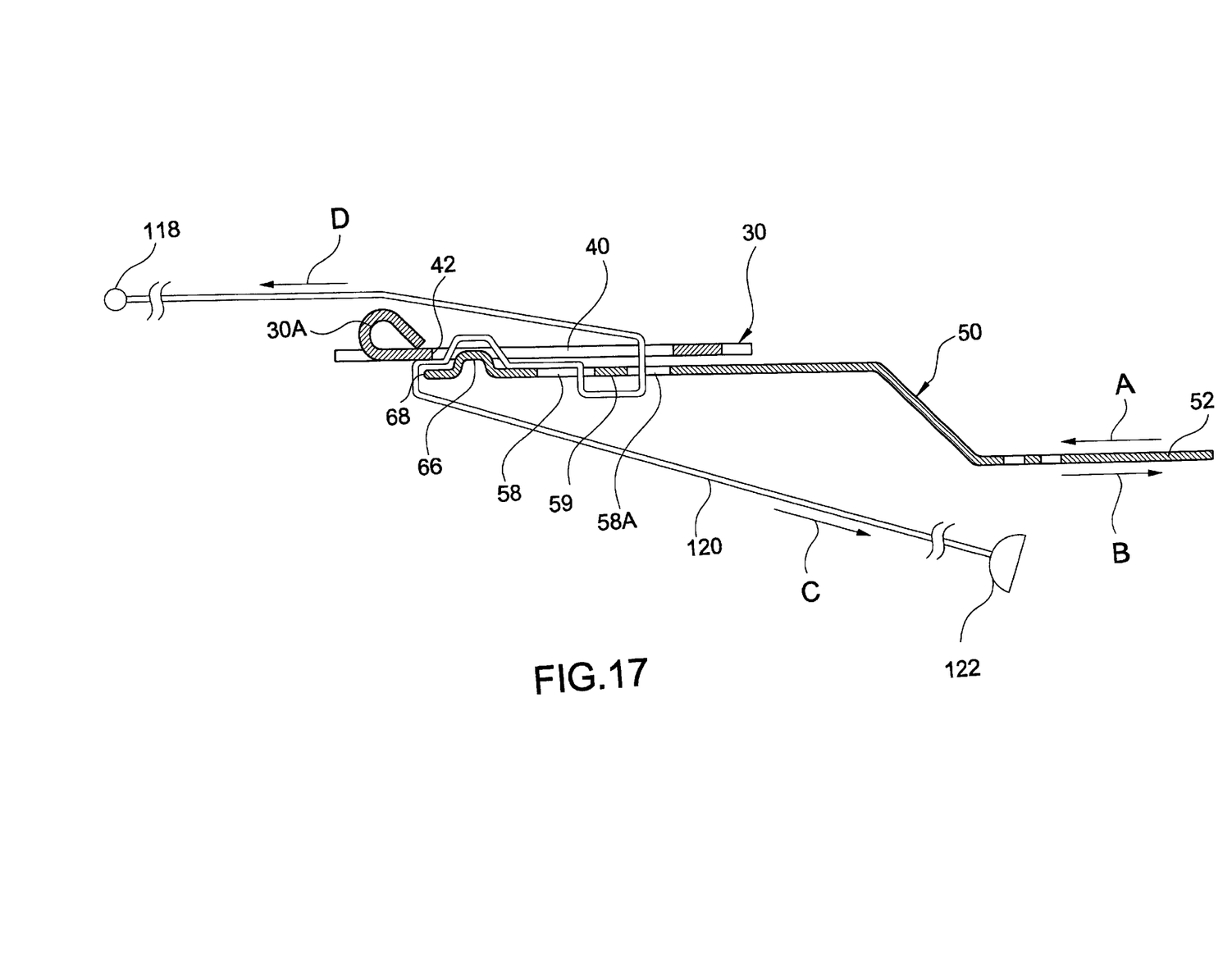
FIG. 17 is a schematic view illustrating the path of a web through the web adjuster shown in FIG. 1.
Figure 18:
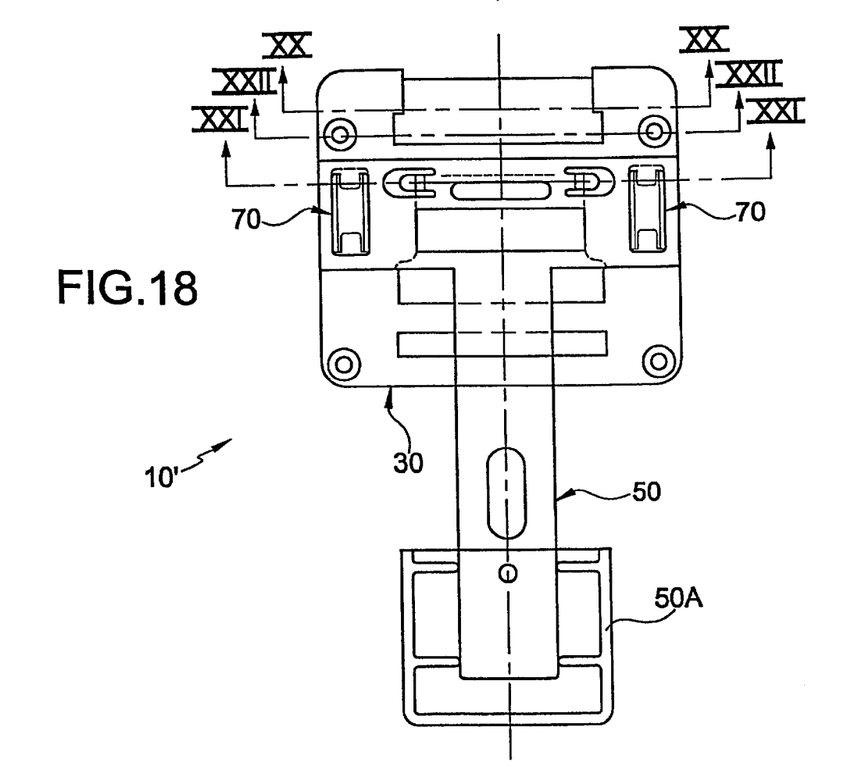
FIG. 18 is a plan view of a web adjuster in accordance with a second embodiment of the invention.
Figure 19:
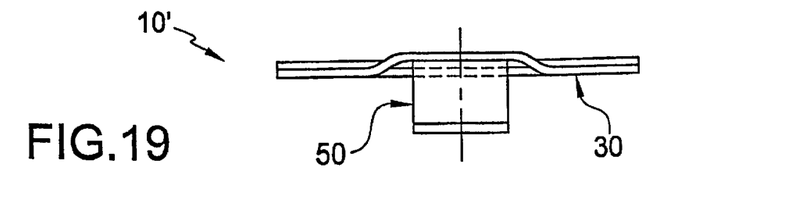
FIG. 19 is a front elevation view of the web adjuster shown in FIG. 18.
Figure 20:
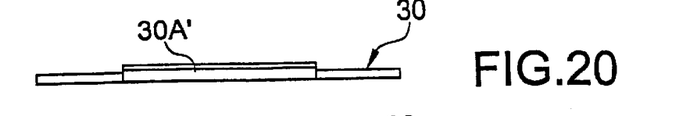
FIG. 20 is a cross-section view taken along line XX—XX in FIG. 18.
Figure 21:
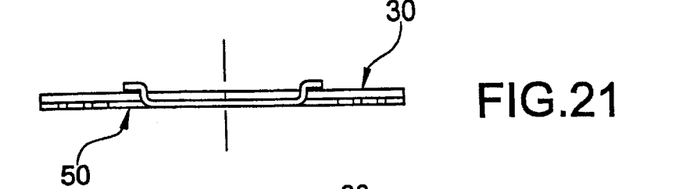
FIG. 21 is a cross-section view taken along line XXI—XXI in FIG. 18.
Figure 22:
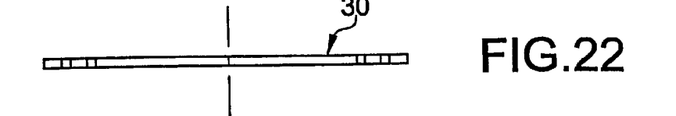
FIG. 22 is a cross-section view taken along line XXII—XXII in FIG. 18.
Figure 23:
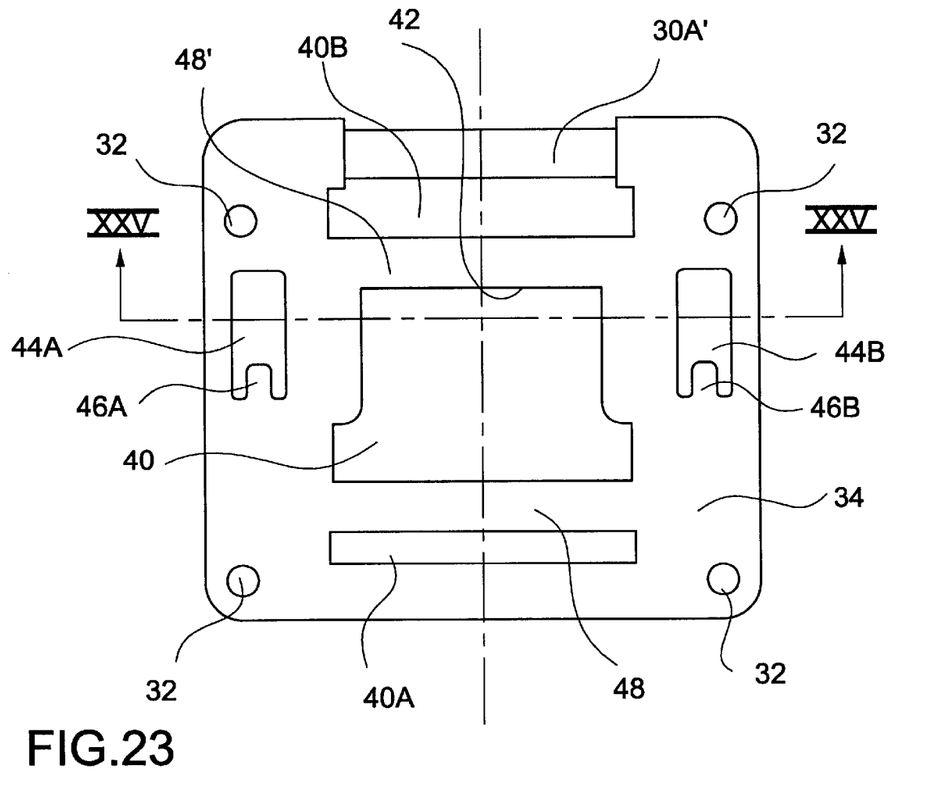
FIG. 23 is a plan view of the mounting plate for the web adjuster shown in FIG. 18.
Figure 24:
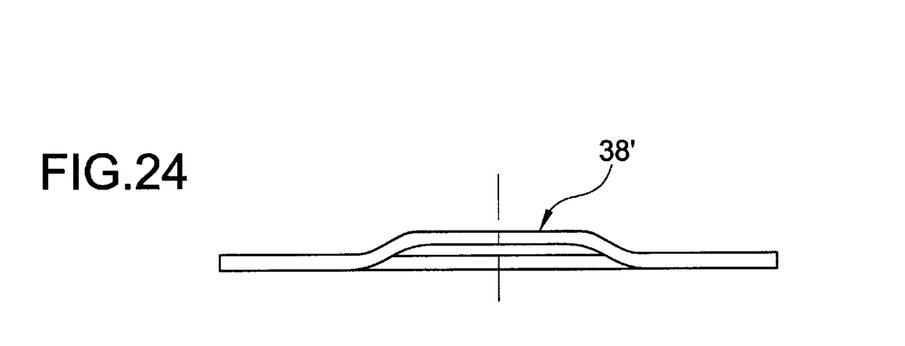
FIG. 24 is a front elevation view of the mounting plate shown in FIG. 23.
Figure 25:
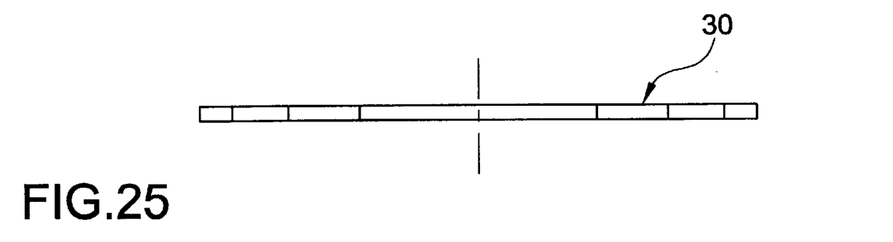
FIG. 25 is a cross-section view taken along line XXVI—XXV in FIG. 23.
Figure 26:
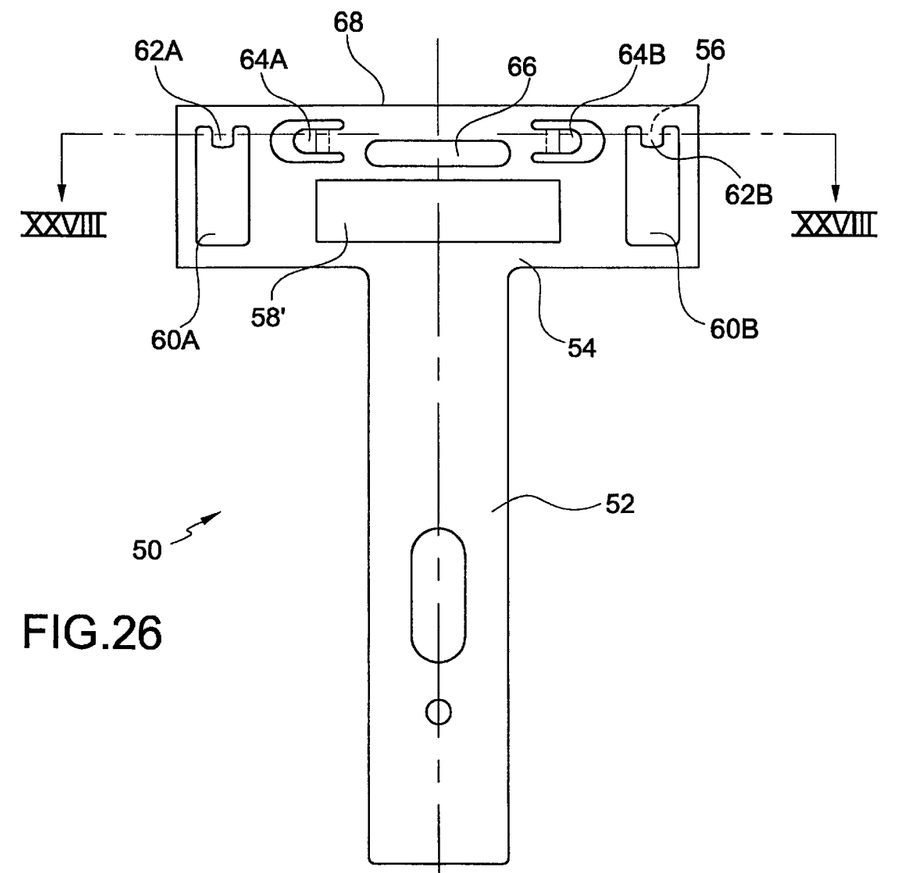
FIG. 26 is a plan view of the sliding plate for the web adjuster shown in FIG. 18.
Figure 27:
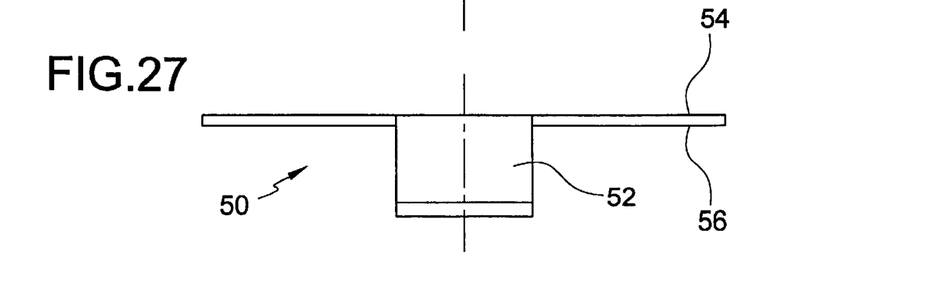
FIG. 27 is a front elevation view of the sliding plate shown in FIG. 26.
Figure 28:
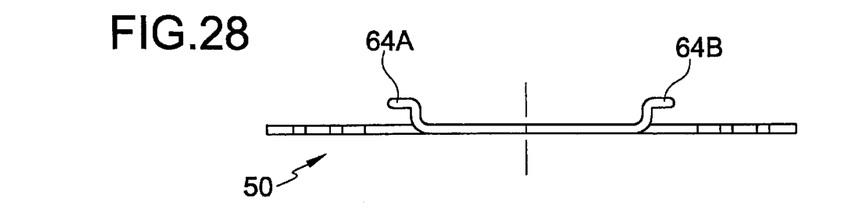
FIG. 28 is a cross-section view taken along line XXVIII—XXVIII in FIG. 26.

Referring to FIG. 17, the operation of the web adjuster 10 will be described. The mounting plate 30 is fixed to the seat (omitted for clarity). The sliding plate 50 is displaceable in shear with respect to the mounting plate 30. That is to say the second major face 36 of the mounting plate 30 slidingly confronts the second major surface 56 of the sliding plate 50.

In the locking configuration of the web adjuster 10, the biasing elements (omitted for clarity) displace the sliding plate 50 with respect to the mounting plate 30 in a direction indicated with arrow A. Thus, the web 120 is pressed between the edge 42 of the aperture 40 and the plateau 66 of the sliding plate 50. Pulling on the neck 52 in the opposite direction, indicated with arrow B, separates the plateau 66 from the edge 42 and releases the web 120.

The web 120 threads through the web adjuster 10 along a circuitous path. The web 120 extends from the ring 118, over the ridge 30A, through the first aperture 40 and the second sub-aperture 58A, over the portion of the first major surface 54 defined by the bridge 59, through the second aperture 58, between the plateau 66 and the edge 42 and around a back edge 68 of the sliding plate 50. The web 120 then extends to a handle 122 at an end of the web 120 that is distal with respect to the ring 118.

To cinch down the shoulder straps 1 16A, 1 16B, the handle 122 is pulled in the direction indicated with arrow C. An advantage of the present invention is that pulling the handle 122 displaces the sliding plate 50 with respect to the mounting plate 30 in the direction indicated with arrow B, thereby separating the plateau 66 from the edge 42. Thus, the web adjuster 10 automatically releases the web 120 when tightening the harness 110.

Conversely, if there is an attempt to release the cinched-down shoulder straps 116A,116B, i.e., by pulling the web 120 in the direction indicated with arrow D, the plateau 66 and the edge 42 increase the grip on the web 120 in proportion to the force attempting to release the should straps 116A,116B. Thus, a child's attempts to remove the shoulder straps 116A,116B are prevented. Similarly, the web 120 also remains locked in the event of a collision that throws the child's body against the shoulder straps 116A, 116B.

In order to release the shoulder straps 116A, 116B, e.g., when it is desirable to remove the child from the seat 100, the sliding plate 50 is displaced in the direction indicated with arrow B by pulling on the neck 52. This enables the web 120 to be pulled in the direction indicated with arrow D against minimal resistance from the web adjuster 10.

Another advantage of the web adjuster 10 is that it acts like a one-way clutch, allowing only cinching, until the web adjuster is moved to its unlocked configuration.

A second embodiment of the present invention will now be described with reference to FIGS. 18–29. A web adjuster 10' is substantially similar to the web adjuster 10, as described with reference to FIGS. 1–17, consequently, a description of the identical features that have previously been described is omitted with regard to this second embodiment. However, five differences between the web adjuster 10 and the web adjuster 10' are noted.

Figure 29:
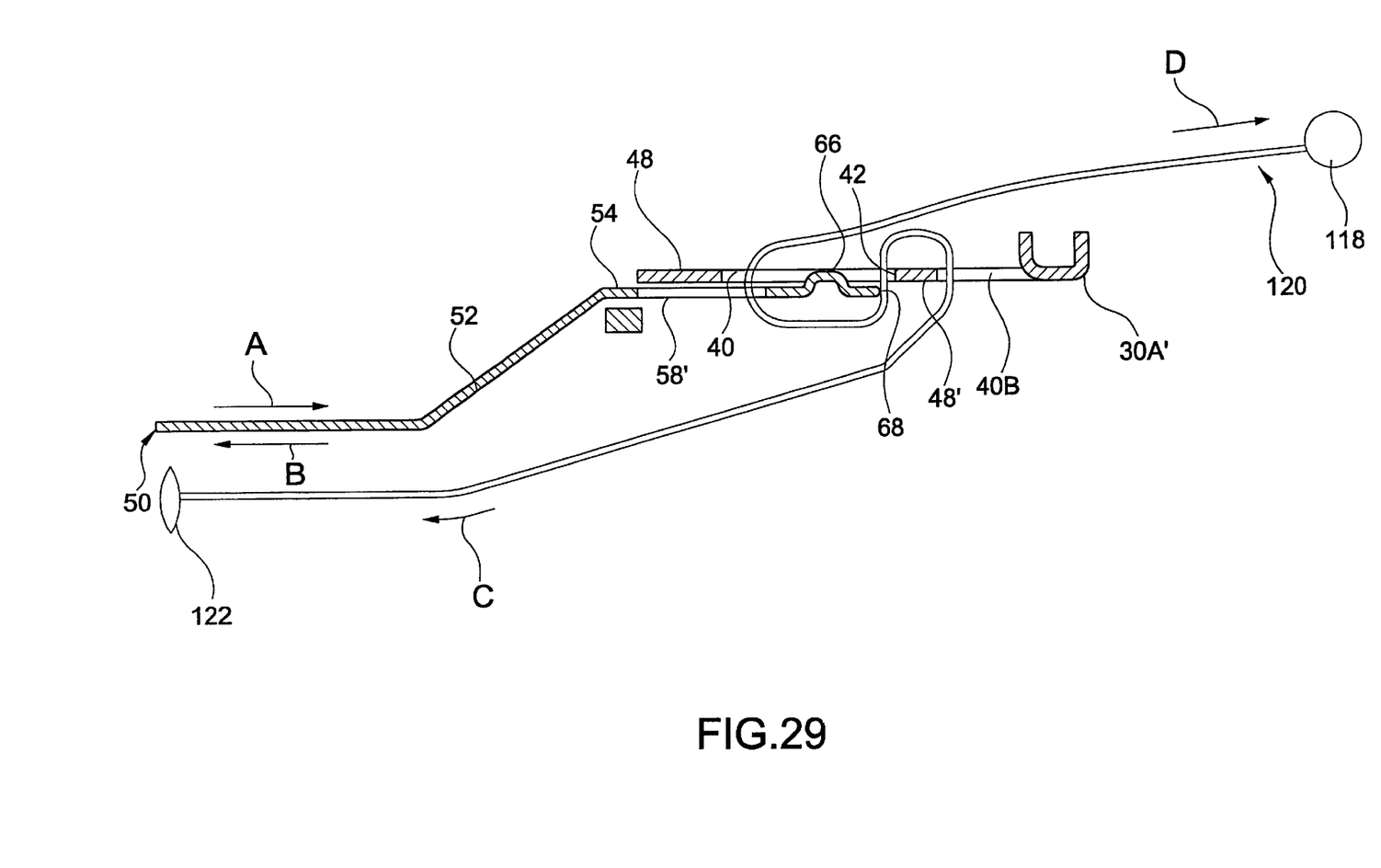
FIG. 29 is a schematic view illustrating the path of a web through the web adjuster show in FIG. 18.

First, a bridge 38' of the mounting plate 30 in web adjuster 10' does not include the shoulder portions 38A,38B of the web adjuster 10. Second, there is a stamped ridge 30A' of the mounting plate 30 in web adjuster 10', rather than the rolled ridge 30A of the web adjuster 10. Third, there is an additional sub-aperture 40B defined by an additional bridge 48' in web adjuster 10'. Fourth, the bridge 59 defining the sub-aperture 58A of the web adjuster 10 has been eliminated, leaving only second aperture 58' in the web adjuster 10'. Fifth, there is a different circuitous path of the web 120 threading through the web adjuster 10', as compared to web adjuster 10. As shown in FIG. 29, the web 120 extends from the ring 118, over the stamped ridge 30A', through the first aperture 40 and the second aperture 58', between the back edge 68 and the edge 42, over the portion of the first major face 34 defined by the additional bridge 48', and through the additional sub-aperture 40B, before extending to the handle 122 at the end of the web 120 that is distal with respect to the ring 118.

In operation, the web adjuster 10' is substantially similar to that of web adjuster 10, except that the web adjuster 10' provides locking against pulling the web 120 in either of the directions indicated with arrows C and D. Thus, the edge 42 and the plateau 66 must be separated in order to cinch down or to release the shoulder straps 116A, 116B. The web adjuster 10' does not act like a one-way clutch as described with respect to the web adjuster 10.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

What is claimed is:

1. An adjuster for limiting longitudinal movement of an elongated web with respect to a base, the adjuster comprising:
    a mounting plate adapted to be fixed to the base, the mounting plate including:
        a first major face generally lying in a first plane;
        a second major face generally lying in a second plane parallel to the first plane, the second plane being spaced from the first plane by a first distance equal to a thickness of the mounting plate;
        a first bridge rising a second distance above the second major face; and
        a first aperture penetrating through the mounting plate, the first aperture defining a first edge extending from the first major face to the second major face;
    a sliding plate displaceable in shear with respect to the mounting plate, the sliding plate including:
        a first major surface generally lying in a third plane that is parallel to the first place, the first major surface confronting and slidingly engaging the second major face;
        a second major surface generally lying in a fourth plane that is parallel to and spaced from the third plane by a third distance equal to a thickness of the sliding plate;
        a second aperture penetrating through the sliding plate from the first major surface to the second major surface; and
        at least one finger retaining the sliding plate with respect to the mounting plate, each at least one finger confronting and slidingly engaging the first major face of the mounting plate; and
        a plateau rising a fourth distance above the first major surface;
        a neck extending transversely under the first bridge; and
    at least one resilient element biasing the plateau toward the first edge in a first shear direction.

2. The adjuster according to claim 1, wherein the projection includes a grip for displacing the sliding plate with respect to the mounting plate in a second shear direction that is opposite to the first shear direction.

3. The adjuster according to claim 1, wherein the second distance is measured between the second plane and a portion of the first major face defining an underside of the first bridge, and wherein the second distance is minimally greater than the third distance.

4. The adjuster according to claim 1, wherein the fourth distance is generally equal to the first distance.

5. The adjuster according to claim 1, wherein the at least one finger extends through the first aperture.

6. The adjuster according to claim 5, wherein the at least one finger includes two fingers on opposite sides of the first aperture.

7. The adjuster according to claim 1, wherein the mounting plate further includes at least one third aperture and the sliding plate includes at least one fourth aperture, and a pair of the third and fourth apertures commonly receives one of the at least one resilient elements.

8. The adjuster according to claim 7, wherein each of two resilient elements is received in a respective one of two pairs of the third and fourth apertures.

9. The adjuster according to claim 8, wherein each of two pairs of third and fourth apertures penetrate through the respective mounting and sliding plates on opposite sides of the respective first and second apertures.

10. The adjuster according to claim 1, wherein the mounting and sliding plates are adapted to define a circuitous path for the belt, the circuitous path extending through the first and second apertures and between the plateau and the first edge.

11. The adjuster according to claim 1, wherein the sliding plate further includes a second bridge dividing the second aperture into a first sub-aperture proximate to the plateau and a second sub-aperture proximate to the projection.

12. A seat for holding a child, the seat comprising:
- a seat portion and a back portion integrally connected to the seat portion;
- a harness adapted for securing the child with respect to the seat, the harness including shoulder straps extending from a front side of the back portion to a rear side of the back portion, the shoulder straps being adapted to overlie shoulders of the child;
- a web slidably connected to the harness on the rear side of the back portion; and
- an adjuster engaging the web, the adjuster comprising:
  - a mounting plate adapted to be fixed to the base, the mounting plate including:
    - a first major face generally lying in a first plane;
    - a second major face generally lying in a second plane parallel to the first plane, the second plane being spaced from the first plane by a first distance equal to a thickness of the mounting plate;
    - a first bridge rising a second distance above the second major face; and
    - a first aperture penetrating through the mounting plate, the first aperture defining a first edge extending from the first major face to the second major face;
  - a sliding plate displaceable in shear with respect to the mounting plate, the sliding plate including:
    - a first major surface generally lying in a third plane that is parallel to the first place, the first major surface confronting and slidingly engaging the second major face;
    - a second major surface generally lying in a fourth plane that is parallel to and spaced from the third plane by a third distance equal to a thickness of the sliding plate;
    - a second aperture penetrating through the sliding plate from the first major surface to the second major surface; and
    - at least one finger retaining the sliding plate with respect to the mounting plate, each at least one finger confronting and slidingly engaging the first major face of the mounting plate; and
    - a plateau rising a fourth distance above the first major surface;
    - a neck extending transversely under the first bridge; and
  - at least one resilient element biasing the plateau toward the first edge.

* * * * *

UNITED STATES PATENT AND TRADEMARK OFFICE
CERTIFICATE OF CORRECTION

PATENT NO.     : 6,273,505 B1  
DATED          : August 14, 2001  
INVENTOR(S)    : Michael Carnahan It is certified that error appears in the above-identified patent and that said Letters Patent is hereby corrected as shown below:

<u>Title page,</u>
Item [73], should read as follows:
-- [73]   Assignee:   Graco Children's Products Inc.,
                      Elverson, PA (US) --

Signed and Sealed this

Twenty-seventh Day of August, 2002

Attest:

Attesting Officer

JAMES E. ROGAN
*Director of the United States Patent and Trademark Office*